United States Patent [19]

Inoue et al.

[11] Patent Number: 5,259,722
[45] Date of Patent: Nov. 9, 1993

[54] ROBOT HAND HAVING ORTHOGONAL THREE ROTATIONAL AXES

[75] Inventors: Akifumi Inoue; Toru Ishii, both of Shizuoka, Japan

[73] Assignee: Yamaha Corporation, Hamamatsu, Japan

[21] Appl. No.: 778,277

[22] Filed: Oct. 17, 1991

[30] Foreign Application Priority Data

Oct. 18, 1990 [JP] Japan .................................. 2-280877
Jul. 12, 1991 [JP] Japan .................................. 3-198733

[51] Int. Cl.⁵ ............................................. B25J 17/02
[52] U.S. Cl. ...................................... 414/735; 269/71; 74/479 R; 901/29
[58] Field of Search ................... 414/729, 735; 294/86.41; 269/71; 74/479; 901/28, 29

[56] References Cited

U.S. PATENT DOCUMENTS

| | | | |
|---|---|---|---|
| 4,262,891 | 4/1981 | Kinney | 269/71 |
| 4,317,560 | 3/1982 | Troyer | 269/71 X |
| 4,705,447 | 11/1987 | Smith | 269/71 X |
| 4,717,309 | 1/1988 | Neuhaus | 414/735 |
| 4,844,431 | 7/1989 | Camp et al. | 269/71 X |

*Primary Examiner*—Michael S. Huppert
*Assistant Examiner*—Donald W. Underwood
*Attorney, Agent, or Firm*—Burns, Doane, Swecker & Mathis

[57] ABSTRACT

A robot hand is implemented by a wrist mechanism coupled with a retaining member for allowing a work to rotate around a first axis, and the wrist mechanism comprises a first bracket member rotational around a second axis and a second bracket member holding the retaining member and rotational with respect to the first bracket member around a third axis, wherein the first to third axes cross at a virtual point within a virtual space occupied by the work so that a distance between the virtual point and a center of the work is decreased, thereby delicately controlling the attitude of the work.

1 Claim, 7 Drawing Sheets

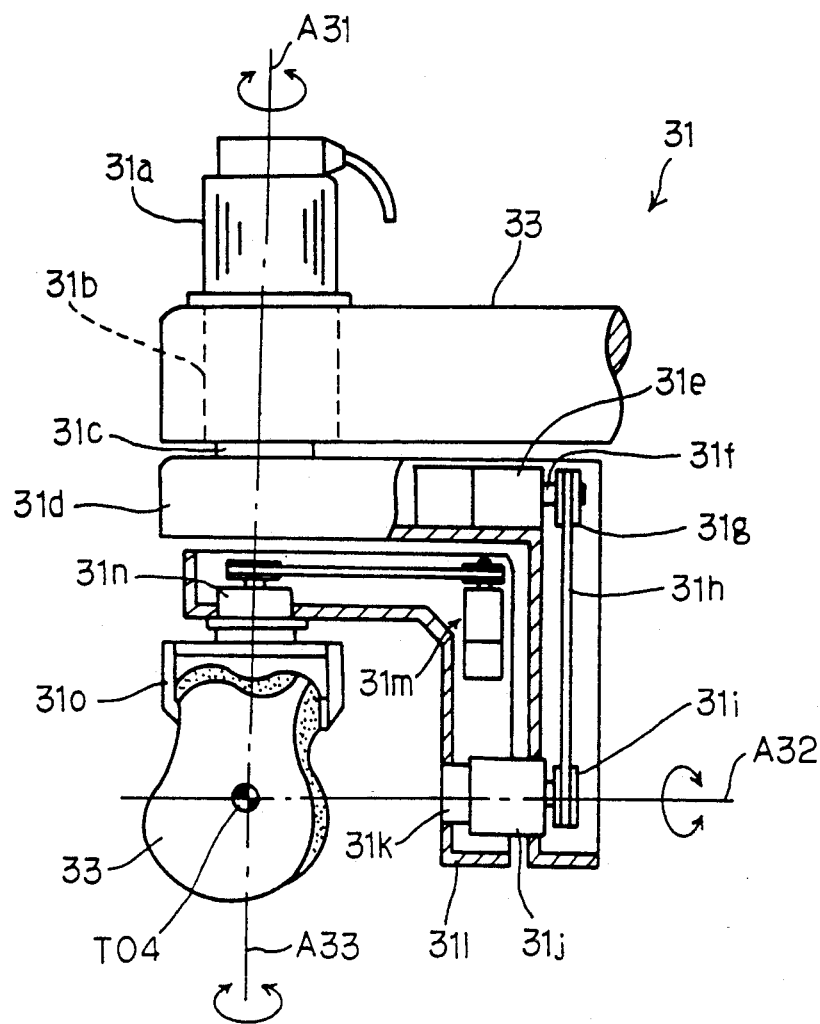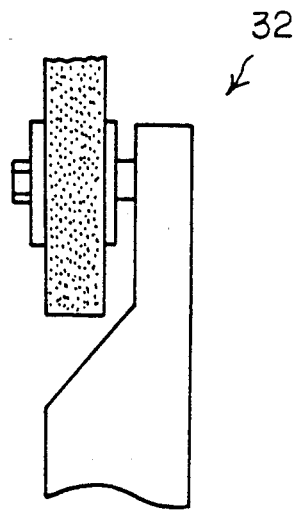
Fig. 6

ROBOT HAND HAVING ORTHOGONAL THREE ROTATIONAL AXES

FIELD OF THE INVENTION

This invention relates to a robotic mechanism and, more particularly, to the mechanism of a robot hand for effectively controlling attitude of a work.

DESCRIPTION OF THE RELATED ART

A prior art robotic machinery system is illustrated in FIG. 1 of the drawings, and comprises a stationary post with a built-in controlling unit 1, an arm 2 movable with respect to the stationary post 1, a hand 3 retained at the leading end of the arm 2, and a tool unit 4. The hand 3 has a wrist mechanism 3a and an end effecter 3b for holding a work 5, and the wrist mechanism 3a is implemented by three rotational joints 3aa, 3ab, and 3ac, and three-dimensionally moves the end effecter 3b. In this instance, the tool unit 4 is of the grinder, and the grindstone 4a is driven for rotation with an electric motor 4b.

In operation, the work 5 is moved toward the tool unit 4, and is pressed against the grindstone 4a. Then, the wrist mechanism 3a causes the work 5 to slide along the grindstone 4a, and the work 5 is finished. Upon completion of the finishing, the robotic machinery system separates the work 5 from the grindstone 4a, and the finished work 5 is replaced with a new work.

In the above described machining sequence, the wrist mechanism 3a is assigned an important part, and is expected to appropriately control the attitude of the work 5. For this reason, the wrist mechanism 3a is hereinbelow described in detail with reference to FIG. 2. The arm 2 transfers torque to the hand 3 through three coaxial shafts 6a, 6b and 6c, and the outermost shaft 6a is driven for rotation with respect to the arm 2. The outermost shaft 6a forms a part of the joint 3aa, and bidirectionally rotates around a center axis A1. The second shaft 6b transfer the rotation through a suitable gear mechanism 7a to a hemisphere member 7b which forms a part of the joint 3ab. The hemisphere member 7b bidirectionally rotates around a center axis A2 with respect to a counter hemisphere member 7c coupled with the outermost shaft 6a. The torque of the innermost shaft 6c is transferred through two sets of gear mechanisms 7d and 7e to the end effecter 3b, and the joint 3ac allows the end effecter 3b to bidirectionally rotate around a center axis A3 with respect to the hemisphere member 7b. Thus, the wrist mechanism with the three joint three-dimensionally moves the end effecter 3b and, accordingly, the work 5 with respect to the arm 2.

As will be understood from the foregoing description with reference to FIG. 2, the wrist mechanism 3a is provided outside a space SP1 defined by the end effecter 3b, and the three center axes A1, A2 and A3 cross at a virtual point TO1 inside the wrist mechanism 3a.

However, a problem is encountered in the prior art robotic machinery system in that the wrist mechanism hardly controls the attitude of the work 5. This is because of the fact that the work is widely spaced apart from the virtual point TO1 by distance L, and, accordingly, the movement of the work 5 is shrunk at the rotational axes A1 to A3. This means that the built-in control unit is expected to delicately control the coaxial shafts 6a to 6c. However, if the distance L is very long, the attitude of the work is uncontrollable. For this reason, the arm 2 moves the hand 3 toward the work 5, and makes a distance between one of the rotational axes 3A to 3C and the virtual point TO1 small. Thus, the prior art robotic machinery system adjusts the work 5 by using not only the wrist mechanism 3a but also the arm 2, and the attitude control becomes complex.

Another problem inherent in the prior art robotic machinery system is large moment exerted on the joints 3aa to 3ac. The center of gravity WO is so far from the virtual point TO1 that reaction F upon the work 5 results in large moment. The large moment is exerted on the wrist mechanism 3a, and are liable to break it.

SUMMARY OF THE INVENTION

It is therefore an important object of the present invention to provide a robot hand which is free from the problems inherent in the prior art robotic machinery system.

To accomplish these objects, the present invention proposes to make rotational axes cross at a virtual point located inside a virtual space occupied by a work. The virtual point thus located in the virtual space decrease a length from the center of gravity and, accordingly, moment due to reaction upon machining.

In accordance with one aspect of the present invention, there is provided a robot hand comprising a) a wrist mechanism, and b) a retaining member supported by the wrist mechanism and holding a work, the wrist mechanism comprising a-1) a first bracket member having a first axis, and rotational around the first axis, and a-2) a second bracket member supported by the first bracket member, and rotational with respect to the first bracket member around a second axis, the first and second axes crossing at substantially right angle, the retaining member allowing the work to rotate around a third axis crossing the second axis at substantially right angle, the first to third axes crossing at a virtual point located within a virtual space occupied by the work.

In accordance with another aspect of the present invention, there is provided a robotic machinery system comprising a) a movable arm, b) a post supporting the movable arm, and allowing the movable arm to move a leading end portion thereof within a cylindrical coordinate system defined therearound, and c) a robot hand supported by the leading end portion, and comprising c-1) a first bracket member having a first axis and rotational therearound, c-2) a second bracket member having a second axis and rotational with respect to the first bracket member around the second axis, and c-3) a retaining member holding a work and allowing the work to rotate around a third axis, the first and second axes crossing at substantially right angle, the second and third axes crossing at substantially right angle, the first to third axes crossing at a virtual point located within a virtual space occupied by the work.

BRIEF DESCRIPTION OF THE DRAWINGS

The features and advantages of the robot hand according to the present invention will be more clearly understood from the following description taken in conjunction with the accompanying drawings in which:

FIG. 6 is a partially sectional front view showing still another robot hand according to the present invention.

DESCRIPTION OF THE PREFERRED EMBODIMENTS

First Embodiment

Figure 1:
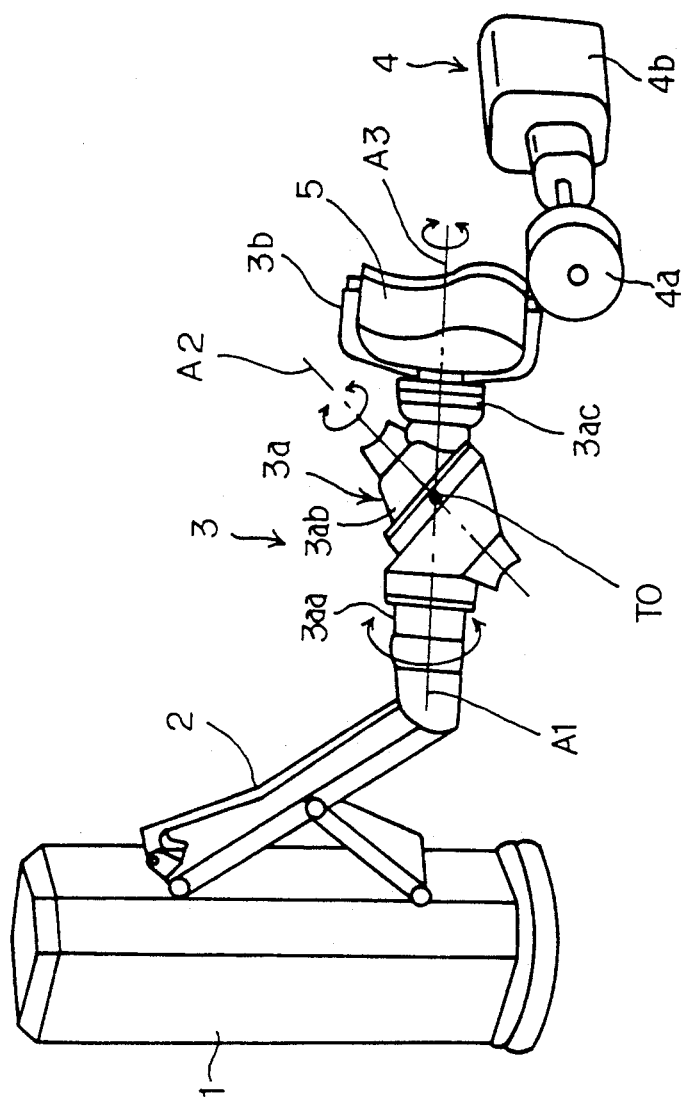
FIG. 1 is a perspective view showing the arrangement of the prior art robotic machinery system.
Figure 2:
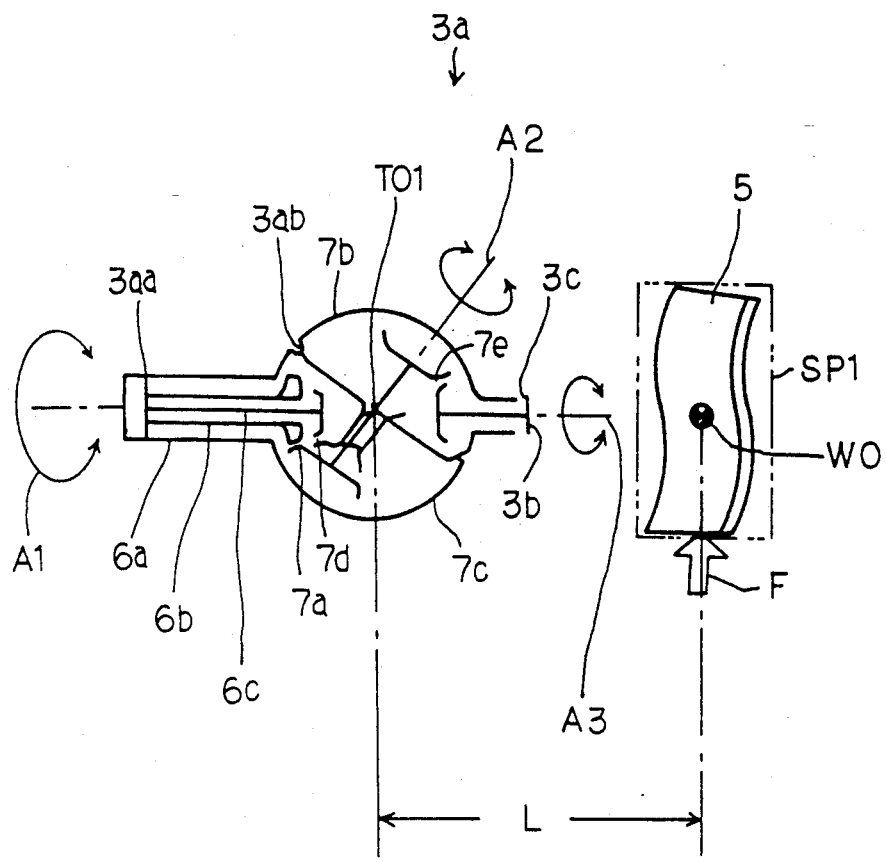
FIG. 2 is a view showing the structure of a wrist mechanism incorporated in the prior art robotic machinery system.
Figure 3:
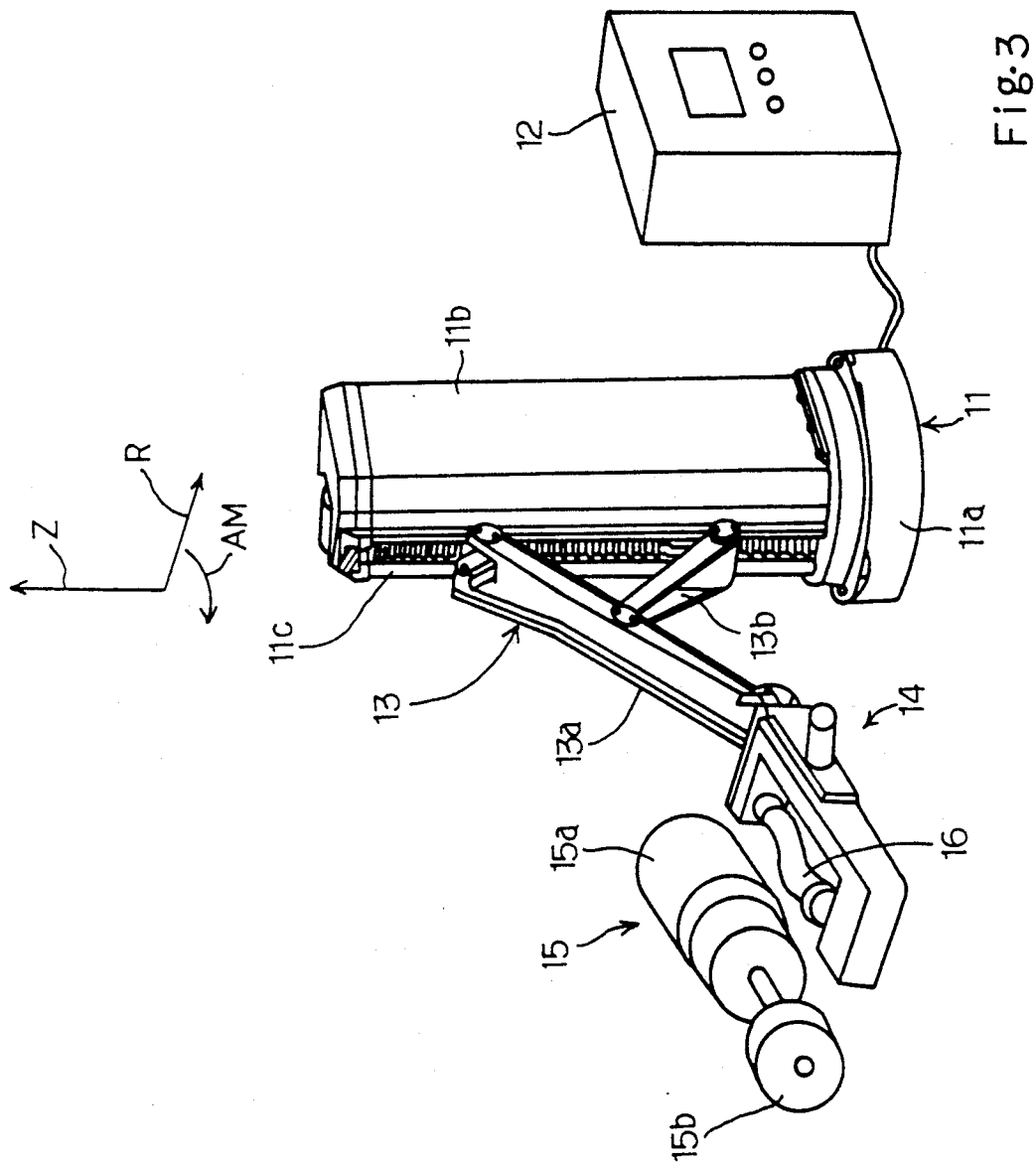
FIG. 3 is a perspective view showing the arrangement of a robotic machinery system according to the present invention.

Referring to FIG. 3 of the drawings, a robotic machinery system embodying the present invention largely comprises a rotational post 11 associated with a controlling unit 12, a movable arm 13 supported by the stationary post 11, a robot hand 14 coupled with the leading end of the movable arm 13, and a grinding unit 15.

The rotational post 11 comprises a stationary base member 11a, and a rotational trunk member 11b, and the rotational trunk member 11b can turn around a vertical axis Z, and the angular motion around the vertical axis Z is controlled by the controlling unit 12. The rotational trunk member 11b has a rack member 11c attached to a side surface of the rotational trunk member 11b and extending along the vertical axis Z. Two pinions are brought into meshing engagement with the rack member 11c, and are rotationally supported by long and short link members 13a and 13b of the movable arm 13. The short link member 13b is jounaled by the long link member 13a, and the pinions are independently driven for rotation. When the pinions concurrently rotate at the same speed, the movable arm 13 is upwardly and downwardly moved along the rack member 11c. If only one of the pinions is driven for rotation, the long link member 13a turns around a center axis of the other pinion, and the angle with respect to the rack member 11c is varied. Thus, the rotational post 11 and the movable arm 13 allows the robot hand 14 to travel in a space defined by a cylindrical coordinate system Z-R.

Figure 4:
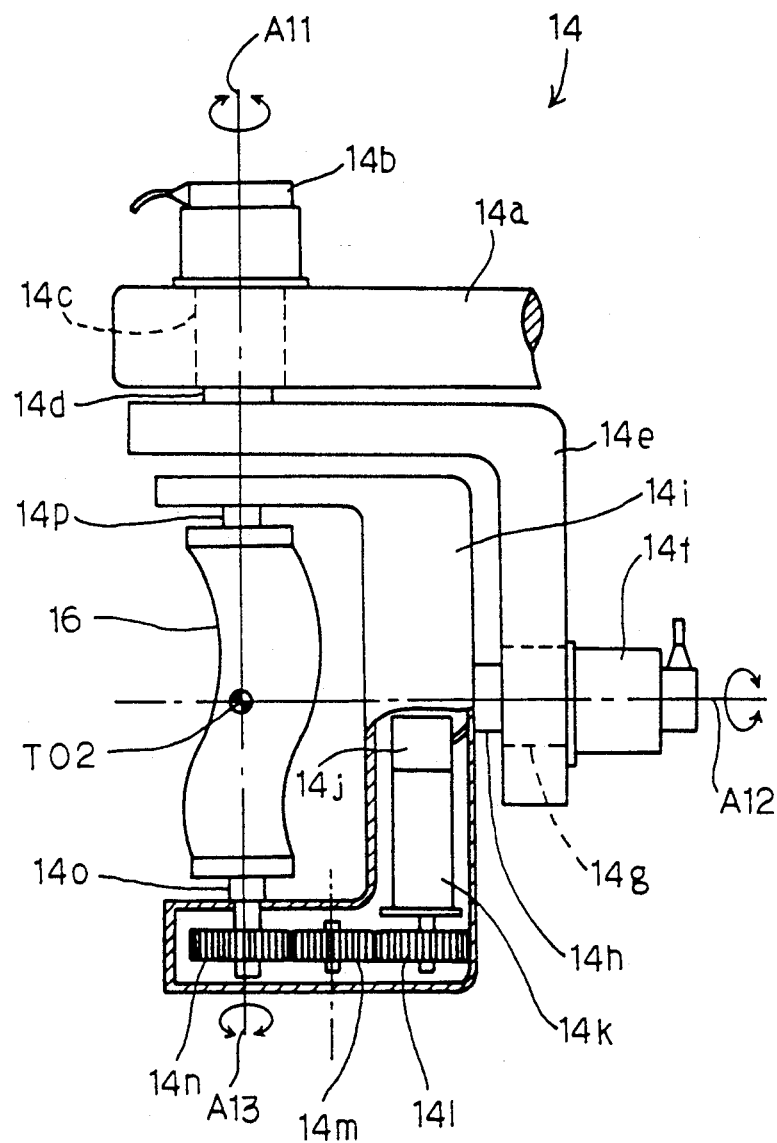
FIG. 4 is a partially sectional front view showing a robot hand incorporated in the robotic machinery system shown in FIG. 3.

The robot hand 14 holds a work 16, and controls the attitude of the work 16 in cooperation with the movable arm 13. FIG. 4 shows the structure of the robot hand 14 in detail. A bracket member 14a is supported by the leading end of the long link member 13a, and an electric motor unit 14b is retained by the bracket member 14a. The electric motor unit 14b is coupled with a reduction gear unit 14c, and the output shaft 14d of the reduction gear unit 14c is fixed to a generally L-shaped bracket member 14e. The electric motor unit 14b produces torque, and the torque is transmitted through the reduction gear unit 14c to the output shaft 14d. Then, the bracket member 14e is bidirectionally driven for rotation around a rotational axis A11. A second electric motor unit 14f is supported by the bracket member 14e, and is coupled with a reduction gear unit 14g. The output shaft 14h of the reduction gear 14g is fixed to a generally C-shaped retaining member 14i, and the retaining member 14i has a hollow space inside thereof. The electric motor unit 14f produces torque, and the torque is transmitted through the reduction gear unit 14g to the output shaft 14h. Then, the retaining member 14i is driven for rotation around a rotational axis A12, and the rotational axes A11 and A12 cross at substantially right angle. In the hollow space inside the retaining member 14i, a third electric motor unit 14j is accommodated, and the third electric motor unit 14j is also coupled with a reduction gear unit 14k. A small gear 141 is fixed to the output shaft of the reduction gear unit 14k, and the small gear 141 is held in meshing engagement with another small gear 14m. The small gear 14m is further held in meshing engagement with yet another small gear 14n, and these small gears 141 to 14n are rotational with respect to the retaining member 14i. The small gear 14n is coupled with a rotational retainer 14o, and the retainer 14o is confronted with another retainer 14p also rotationally supported by the retaining member 14i. The rotational axes of the retainers 14o and 14p are substantially aligned with each other, and the work 16 is held between the retainers 14o and 14p. When the electric motor unit 14j rotates, the retainers 14o and 14p cause the work 16 to be driven for rotation around a rotational axis A13, and the rotational axes A12 and A13 cross at substantially right angle. Thus, there is provided three orthogonal rotational axes A11 to A13 in the robot hand 14. When the retaining member 14i is designed, the designer estimates the volume of the work 16, and decides the size of the retaining member 14i. This means that a virtual space occupied by the work 16 is estimated for the retaining member 14i. The three rotational axes A11 to A13 cross at a virtual point TO2, and the virtual point TO2 is matched with the center of gravity of the work 16 in this instance. However, the virtual point TO2 may be located within the virtual space occupied by the work 16 in another implementation.

Turning back to FIG. 3, the grinding unit 15 comprises an electric motor unit 15a and a grindstone 15b. However, the grindstone 15b may be replaced with a buff or a belt sander.

Description is hereinbelow made on grinding operation on the work 16. First, the rotational trunk member 11b is turned around Z-axis, and movable arm 13 moves the robot hand 14 to a predetermined position adjacent to the grindstone 15b. Subsequently, the three electric motor units 14b, 14f and 14j drive the bracket member 14e, the retaining member 14i and the work 16 over appropriate angles, respectively, and the work 16 is pressed against the grindstone 15b. In this initial attitude controlling sequence, the robot hand 14 can delicately adjust the work to a target position, because the motion of the robot hand 14 is hardly enlarged by virtue of the virtual position within the virtual space. This results in that the motion of the movable arm 13 is decreased and made simple.

The robot hand 14 further moves the work 16, and the motion of the robot hand 14 traces a finishing surface for the work 16. During the finishing, reaction is exerted on the work 16, and is transmitted to the robot hand 14. However, the robot hand 14 is subjected to a relatively small amount of moment, and, for this reason, is hardly broken.

Second Embodiment

Figure 5:
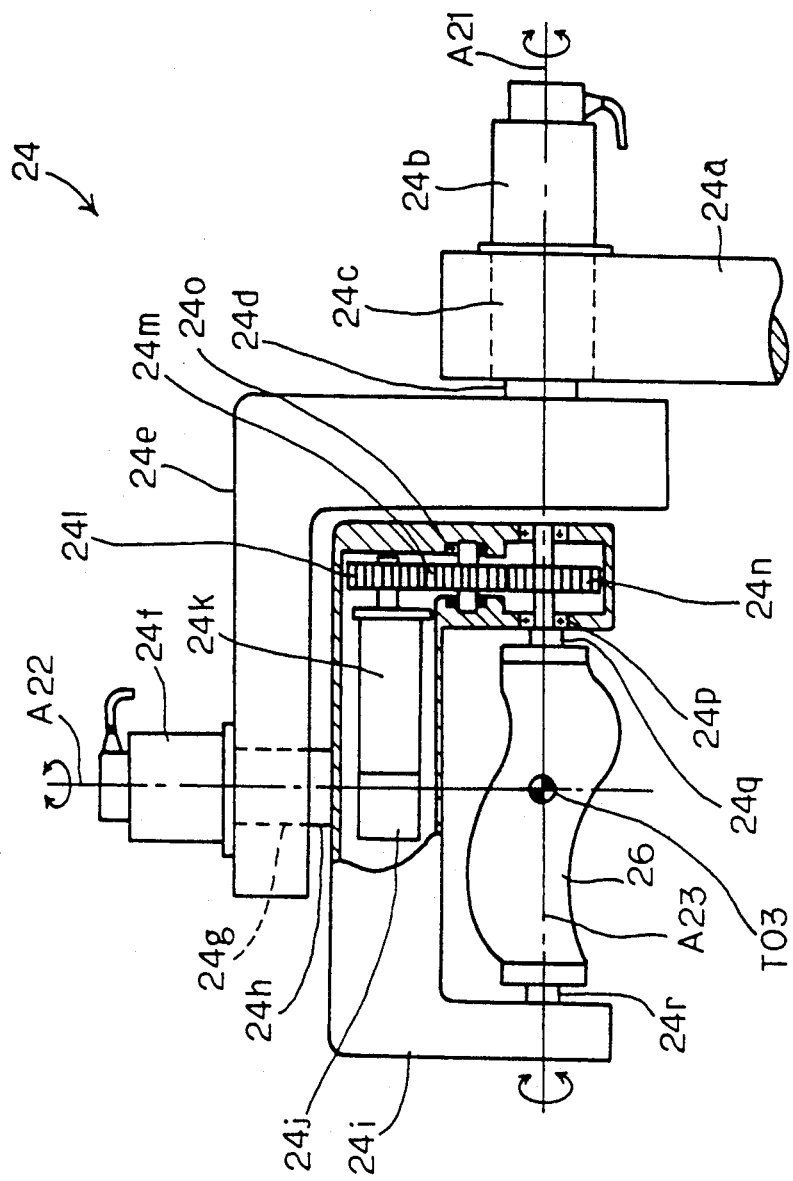
FIG. 5 is a partially sectional front view showing another robot hand according to the present invention.

Turning to FIG. 5 of the drawings, another robot hand 24 incorporated in a robotic machinery system embodying the present invention is illustrated. The robotic machinery system implementing the second embodiment is similar to the first embodiment except for the robot hand 24, and description is focused upon the robot hand 24 only. A bracket member 24a is supported by the leading end of a movable arm, and an electric motor unit 24b is retained by the bracket member 24a. The electric motor unit 24b is coupled with a reduction gear unit 24c, and the output shaft 24d of the reduction gear unit 24c is fixed to a generally L-shaped bracket member 24e. The electric motor unit 24b produces torque, and the torque is transmitted through the reduction gear unit 24c to the output shaft 24d. Then, the bracket member 24e is bidirectionally driven for rotation around a rotational axis A21. The robot hand 24 implementing the second embodiment is controlled to make the rotational axis A21 substantially horizontal, and easily holds and release a work 26 rather than the first embodiment.

A second electric motor unit 24f is supported by the bracket member 24e, and is coupled with a reduction gear unit 24g. The output shaft 24h of the reduction gear 24g is fixed to a generally C-shaped retaining member 24i, and the retaining member 24i has a hollow space inside thereof. The electric motor unit 24f produces torque, and the torque is transmitted through the reduction gear 24g to the output shaft 24h. Then, the retaining member 24i is bidirectionally driven for rotation around a rotational axis A22, and the rotational axes A21 and A22 cross at substantially right angle. In the hollow space inside the retaining member 24i, a third electric motor unit 14j is accommodated, and the third electric motor unit 24j is also coupled with a reduction gear unit 24k. A small gear 24l is fixed to the output shaft of the reduction gear unit 24k, and the small gear 24l is held in meshing engagement with another small gear 24m. The small gear 24m is further held in meshing engagement with yet another small gear 24n, and these small gears 24m and 24n are journaled by bearing units 24o and 24p. The small gear 24n is coupled with a rotational retainer 24q, and the retainer 24q is opposed to another retainer 24r also rotationally supported by the retaining member 24i. The rotational axes of the retainers 24q and 24r are substantially aligned with each other, and the work 26 is held between the retainers 24q and 24r. When the electric motor unit 24j rotates, the retainers 24q and 24r causes the work 26 to be bidirectionally driven for rotation around a rotational axis A23, and the rotational axes A22 and A23 cross at substantially right angle. Thus, there is provided three orthogonal rotational axes A21 to A23 in the robot hand 24. The three rotational axes A21 to A23 cross at a virtual point TO3, and the virtual point TO3 is matched with the center of gravity of the work 26 in this instance. The virtual point TO3 is located within a virtual space occupied by the work 26, and, for this reason, the advantages of the first embodiment are also achieved by the second embodiment.

Third Embodiment

Turning to FIG. 6 of the drawings, yet another robot hand embodying the present invention is illustrated. The robot hand 31 shown in FIG. 6 forms a part of a robotic machinery system together with a sander unit 32. However, the sander unit 32 may be replaced with a buffing unit or a brushing unit in another implementation. The other component units of the robotic machinery system embodying the third embodiment are similar to those of the first embodiment, and, for this reason, no further description is incorporated hereinbelow for the sake of simplicity.

The robot hand 31 comprises a first electric motor unit 31a supported by a bracket member 33 forming a part of a movable arm, and the first electric motor unit 31a is coupled with a first reduction gear unit 31b. The output shaft 31c of the first reduction gear unit 31b is connected to a generally L-shaped first bracket member 31d, and the first electric motor unit 31a drives the first bracket member 31d for rotation around a rotational axis A31. A second electric motor unit 31e is supported by the first bracket member 31d, and the output shaft 31f of the second electric motor unit 31e is fixed to a pulley 31g, and a belt 31h is spread between the pulley 31g and another pulley 31i. The pulley 31i is coupled to an input shaft of a reduction gear unit 31h, and the output shaft 31k of the reduction gear unit 31j is coupled with a second bracket member 31l. The electric motor unit 31e produces torque, and the torque is transmitted through the belt-transmission system to the reduction gear 31j. Then, the second bracket member 31l is driven for rotation around a rotational axis A32, and the rotational axes A31 and A32 cross at substantially right angle. A third electric motor unit 31m is supported by the second bracket member 31l, and the third electric motor unit 31m is also coupled with a third reduction gear unit 31n through a belt transmission system. The output shaft of the third reduction unit 31n is coupled with a retaining member 31o, and the retaining member 31o holds a work 33. When the electric motor unit 31m rotates, the retaining member 31o causes the work 33 to be driven for rotation around a rotational axis A33, and the rotational axes A32 and A33 cross at substantially right angle. Thus, there is provided three orthogonal rotational axes A31 to A33 in the robot hand 31. When the retaining member 31o is designed, the designer estimates the volume of the work 33, and decides the size of the retaining member 31o. This means that a virtual space occupied by the work 33 is estimated for the retaining member 31o. The three rotational axes A31 to A33 cross at a virtual point TO4, and the virtual point TO4 is matched with the center of gravity of the work 33 in this instance. However, the virtual point TO4 may be located within the virtual space occupied by the work 33 in another implementation.

In this instance, the sander unit 32 is placed below the robot hand 31, and the work 33 is downwardly moved onto the sander unit 32. The advantages of the third embodiment are similar to those of the previously described embodiments, and description is omitted for avoiding repetition.

Fourth Embodiment

Figure 7:
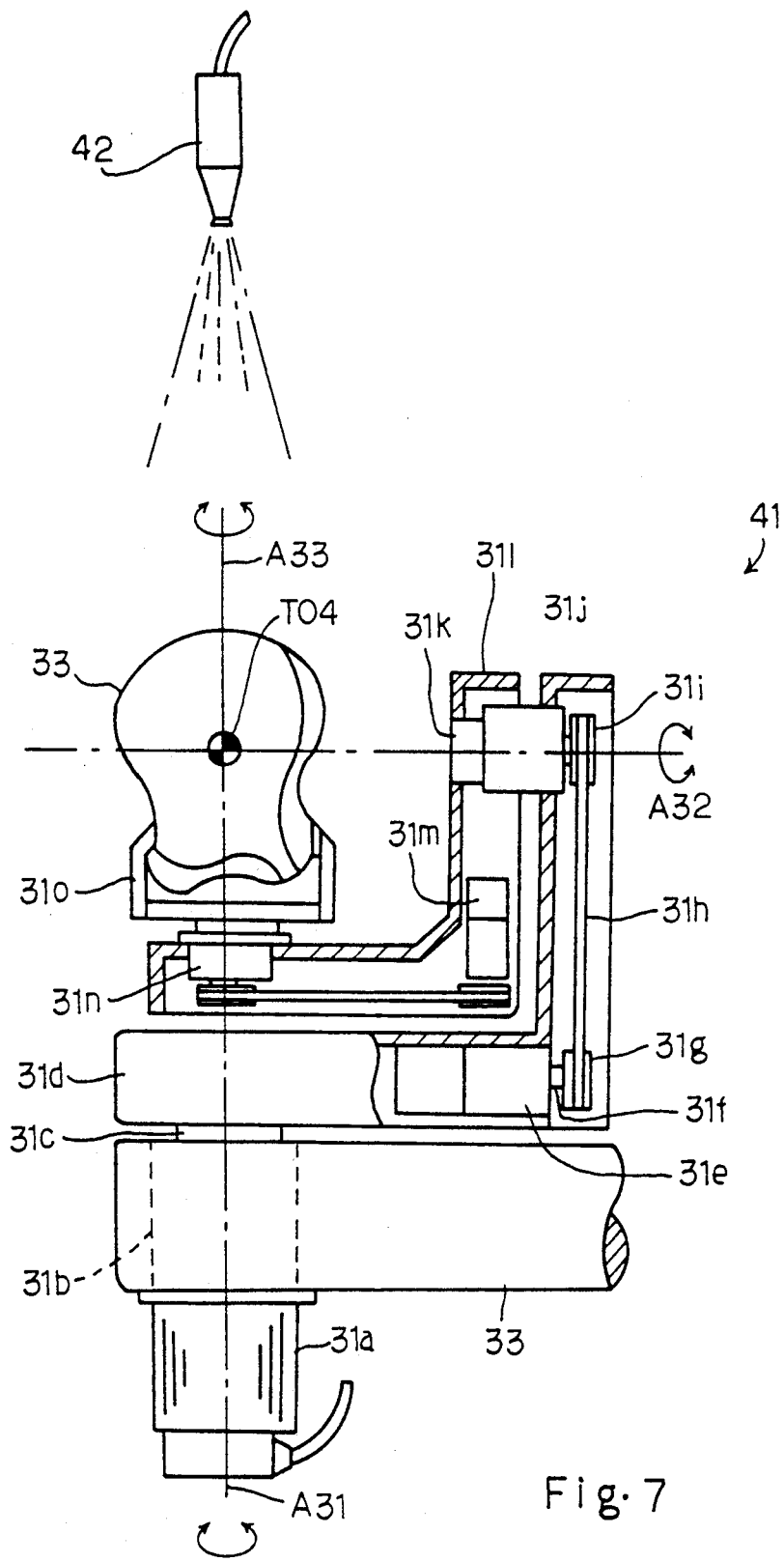
FIG. 7 is a partially sectional front view showing yet another robot hand according to the present invention.

Turning to FIG. 7 of the drawings, yet another robotic machinery system embodying the present invention is illustrated. A robot hand 41 incorporated in the robotic machinery system is similar to the robot hand 31, and component members and parts are labeled with the same references used in FIG. 6 without any detailed description. One of the differences between the third and fourth embodiments is position of the robot hand 41. In the third embodiment, the robot hand 31 is placed over the sander unit 32. However, in the fourth embodiment, a spray unit 42 is provided over the robot hand 41, and the spray unit 42 downwardly sprays paint on the work 33, by way of example. However, the spray unit 42 may be replaced with a contactless tool such as a nozzle of a shot blasting unit or a nozzle of a sandblasting unit.

In the operation, the work 33 is lifted up toward the spray unit 42 through rotation around the rotational axis A32. However, other operational stages of the sequence and the advantages are similar to those of the previous described embodiments, and no further description is incorporated.

Although particular embodiments of the present invention have been shown and described, it will be obvious to those skilled in the art that various changes and modifications may be made without departing from the spirit and scope of the present invention.

What is claimed is:

1. A robot hand comprising:
   a) a wrist mechanism, and
   b) a retaining member supported by said wrist mechanism and holding a work, said wrist mechanism further including;
   a-1) a first bracket member having a first axis, a first reduction gear unit coupled with a first electric motor unit for rotatably driving said first bracket member around said first axis,
   a-2) a second bracket member supported by said first bracket member, a second reduction gear unit coupled with a second electric motor unit for rotatably driving said second bracket member with respect to said first bracket member around a second axis, said second reduction unit and said second electric motor unit being supported by said first bracket member, said first and second axes crossing at a substantially right angle, said retaining member allowing said work to rotate around a third axis crossing said second axis at a substantially right angle, said first to third axes crossing at a virtual point located within a virtual space occupied by said work, said work having a center of gravity substantially matched with said virtual point, and
   a-3) a third reduction gear unit coupled with a third electric motor unit for rotatably driving said retaining member, said third reduction gear unit and said third electric motor unit being supported by said second bracket member, said first bracket member being formed by first and second straight members connected at a right angle shaped into a generally L configuration, said second reduction gear unit and said second electric motor unit being supported by an end portion of said first straight member the opposite end of which is connected to said second straight member, said second bracket being formed by a third straight member and by fourth and fifth straight members, respectively projecting from both end portions of said third straight member at a right angle, said second axis crossing said third straight member at a center portion thereof, said third axis passing through leading end portions of said fourth and fifth straight members.

* * * * *